(12) United States Patent
Demirci et al.

(10) Patent No.: US 8,358,857 B2
(45) Date of Patent: Jan. 22, 2013

(54) DYNAMIC CLUSTERING FOR ADAPTIVE PREDICTION FILTERS

(75) Inventors: Oguz Demirci, San Jose, CA (US); Marco Paniconi, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 929 days.

(21) Appl. No.: 12/245,664

(22) Filed: Oct. 3, 2008

(65) Prior Publication Data

US 2010/0086224 A1   Apr. 8, 2010

(51) Int. Cl.
*G06K 9/62* (2006.01)
*G06K 9/365* (2006.01)
*G06F 17/30* (2006.01)

(52) U.S. Cl. ........ 382/225; 382/224; 382/276; 707/741; 707/758

(58) Field of Classification Search .................. 382/225, 382/276, 295, 305, 238, 224; 716/119, 118, 716/122, 123, 135, 124, 132, 154; 700/121; 706/12, 45, 921, 123, 52; 370/338, 344; 707/758, 741; 348/700; 345/589, 443; 455/447, 455/429, 446, 448, 426.1, 12.1; 375/232; 324/207.21, 252, 207.25; 313/407, 405, 313/404
See application file for complete search history.

(56) References Cited

U.S. PATENT DOCUMENTS

| | | | | |
|---|---|---|---|---|
| 5,808,899 A | * | 9/1998 | Scepanovic et al. | 716/123 |
| 5,812,740 A | * | 9/1998 | Scepanovic et al. | 706/45 |
| 5,971,095 A | | 10/1999 | Ozbek | |
| 6,018,317 A | | 1/2000 | Dogan et al. | |
| 6,154,746 A | * | 11/2000 | Berchtold et al. | 1/1 |
| 6,519,368 B1 | | 2/2003 | Kondo et al. | |
| 6,804,400 B1 | | 10/2004 | Sharp | |
| 7,136,765 B2 | | 11/2006 | Maier et al. | |
| 7,272,612 B2 | * | 9/2007 | Birdwell et al. | 1/1 |
| 7,467,172 B2 | | 12/2008 | Druck | |

* cited by examiner

*Primary Examiner* — Sheela Chawan
(74) *Attorney, Agent, or Firm* — Blakely, Sokoloff, Taylor & Zafman LLP

(57) ABSTRACT

An initial value is assigned to a center point for each cluster in a plurality of clusters. Each point in a point space is assigned to a closest cluster based on the distance between the each point and the center of nearest cluster. A first-assignment value is determined for each center point using the clusters the points are assigned to. A first-assignment dynamic validity index of a current cluster configuration is evaluated. Each point in the point space is reassigned to the closest cluster based on the first-assignment value of each center. A second-assignment value is determined for the center of each cluster according to the reassigning. A second-assignment dynamic validity index is evaluated using the second-assignment values. The current cluster configuration is selected if the difference between the dynamic validity indices is less than a threshold.

10 Claims, 15 Drawing Sheets
(8 of 15 Drawing Sheet(s) Filed in Color)

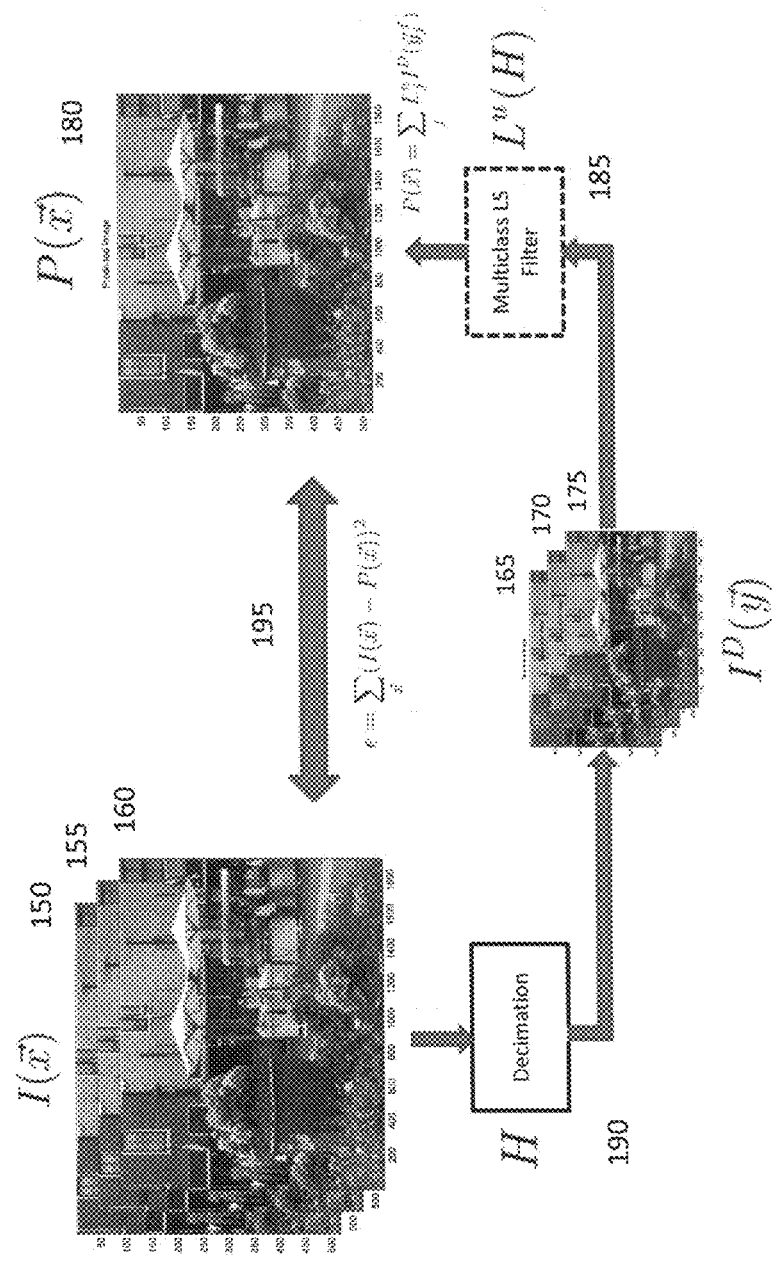

Figure 13

SNR performance comparison

SNR for field 03

Number of classes

| # of eigenvectors | Mono | Uniform | Clustering \w random initialization | | |
|---|---|---|---|---|---|
| | | 27 | 27 | 32 | 64 | 128 |
| 3 | 34.30 | 34.55 | 34.62 | 34.63 | 34.79 | 35.03 |
| 5 | | n/a | 34.87 | 34.92 | 35.02 | 35.30 |
| 7 | | n/a | 34.93 | 34.95 | 35.12 | 35.36 |
| 9 | | n/a | 34.90 | 34.86 | 35.11 | 35.35 |

1310, 1305, 1315

DYNAMIC CLUSTERING FOR ADAPTIVE PREDICTION FILTERS

RELATED APPLICATIONS

The present application is related to the following commonly-owned, concurrently-filed application: application Ser. No. 12/245,661, filed Oct. 3, 2008, now U.S. Pat. No. 8,150,195, which issued on Apr. 3, 2012, entitled "Adaptive Prediction Using a Dimensionality Reduction Process".

FIELD OF THE INVENTION

This invention relates generally to video processing, and more particularly to predicting using a dimensionality reduction process.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies: Copyright© 2008, Sony Electronics Inc., All Rights Reserved.

BACKGROUND OF THE INVENTION

A fundamental problem in video coding is prediction of high resolution images using available low resolution data. Least square (LS) filters are commonly used in these cases, and the LS filter coefficients are used to produce higher resolution images using available low resolution data, possibly from different times.

Zooming requires utilizing data possibly from different times and combining the available information to obtain a high resolution image for the current time. The training of the LS filters is possible by generating decimated images and finding the best set of LS filters to obtain back the original images minimizing the different between the original and predicted images.

A filter tap is a pattern overlaid on a region of pixels. The pixels overlapping the filter tap form the basis of filter coefficients associated with that pixel.

SUMMARY OF THE INVENTION

An initial value is assigned to a center point for each cluster in a plurality of clusters. Each point in a point space is assigned to a closest cluster based on the distance between the each point and the center of nearest cluster. A first-assignment value is determined for each center point using the clusters the points are assigned to. A first-assignment dynamic validity index of a current cluster configuration is evaluated. Each point in the point space is reassigned to the closest cluster based on the first-assignment value of each center. A second-assignment value is determined for the center of each cluster according to the reassigning. A second-assignment dynamic validity index is evaluated using the second-assignment values. The current cluster configuration is selected if the difference between the dynamic validity indices is less than a threshold.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIG. 1B illustrates a relationship between original, decimated, and predicted fields;

FIG. 13 is a diagram illustrating a performance comparison according to various configurations of an embodiment of the invention.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
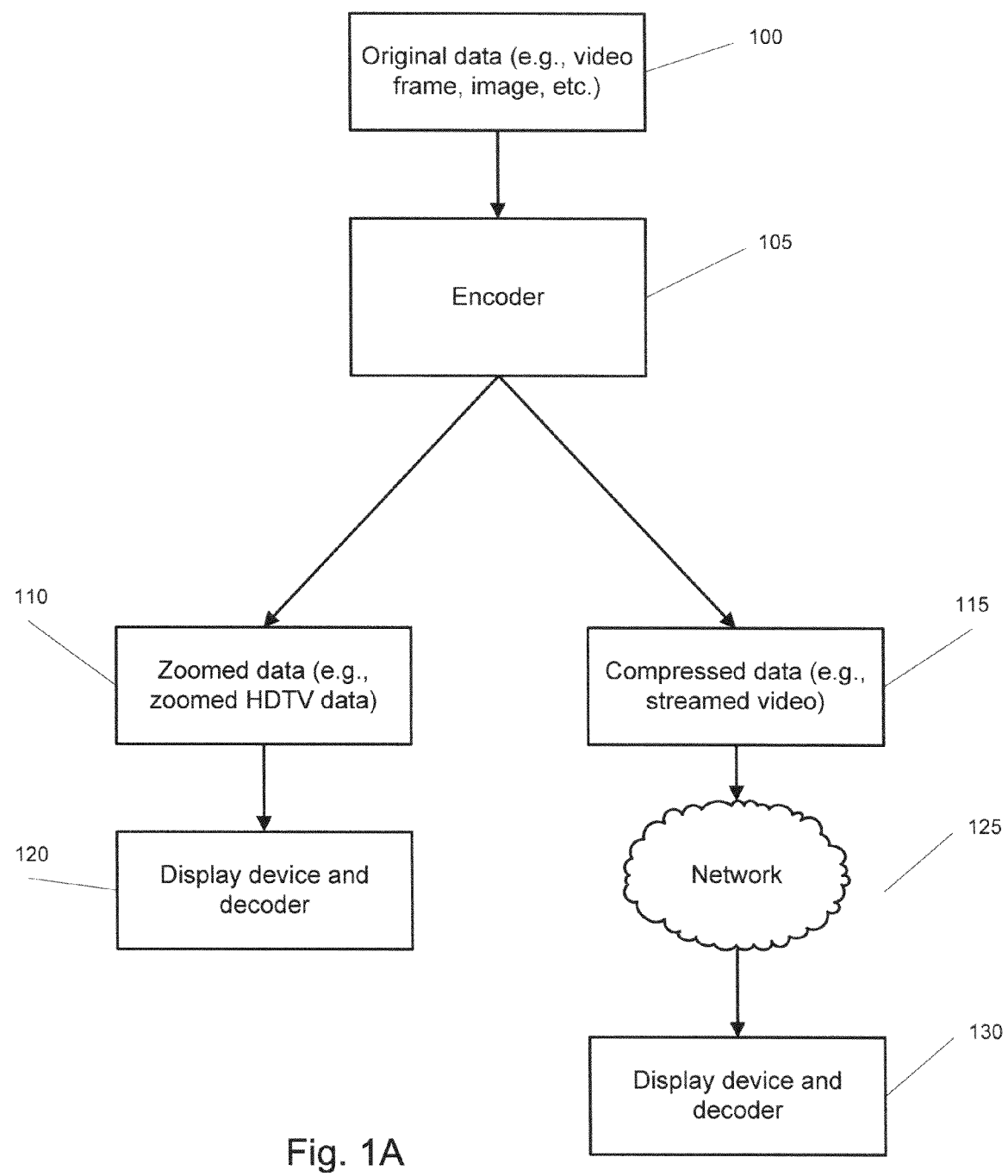
FIG. 1A illustrates one embodiment of adaptive prediction or video processing using a dimensionality reduction process.

Beginning with an overview of the operation of the invention, FIG. 1A illustrates one embodiment of adaptive prediction or video processing using a dimensionality reduction process. Original data 100 is encoded at encoder 105 using adaptive prediction that incorporates a dimensionality reduction process. The original data 100 may be video data from a BluRay player, which a user wishes to view on a standard definition television such as device 120. To accomplish this, encoder 105 may zoom data 100 to produce zoomed data 110, which device 120 is able to decode and display at the appropriate aspect ratio. The encoded data from encoder 105 may take the form of compressed data 115, which is transmitted through network 125 to device 130 to decode and display (e.g., streaming video over the internet.)

In one embodiment, encoder 105 may classify frames of video data and assign individual prediction filters to each class in the frame. Adaptive prediction with classification involves partitioning the pixels of a frame into a number of classes and adapting a filter to that class. A filter may include coefficients for each pixel which may be used to predict or decimate that pixel. The filter coefficients and the corresponding pixel are related through a filter tap. A filter tap is a pattern overlaid on the corresponding pixel and pixels around that pixel. The pattern defines which pixels will be used to generate coefficients. In one embodiment, Principal Component Analysis (PCA) is used to classify video frames into classes. The PCA may represent each pixel in a low resolution frame with the corresponding correlation matrix elements defined by the filter taps. PCA uses the correlation information for each pixel to group pixels with similar spatiotemporal variations in the images into classes.

Defining classification filters depends on the relationship between decimated images and their corresponding original resolution images. FIG. 1B illustrates a relationship between original, decimated, and predicted fields. Original (target) fields 150, 155, and 160 are decimated 190 and corresponding low resolution fields 165, 170, and 175 are obtained. Information available from the decimated fields is used to obtain prediction 180 and LS filter coefficients 185 that minimize the difference between the original fields 150-160 and the predicted field 180. The prediction error 195 may be defined as:

$$e = \sum_{\vec{x}} (I(\vec{x}) - P(\vec{x}))^2 \qquad (1)$$

where I(x) is the original image and P(x) is the predicted image, where P(x) is defined as:

$$P(\vec{x}) = \sum_j L_j^u I^D(\vec{y}_j) \qquad (2)$$

where $I^D(y)$ represents the decimated image.

Figure 2:
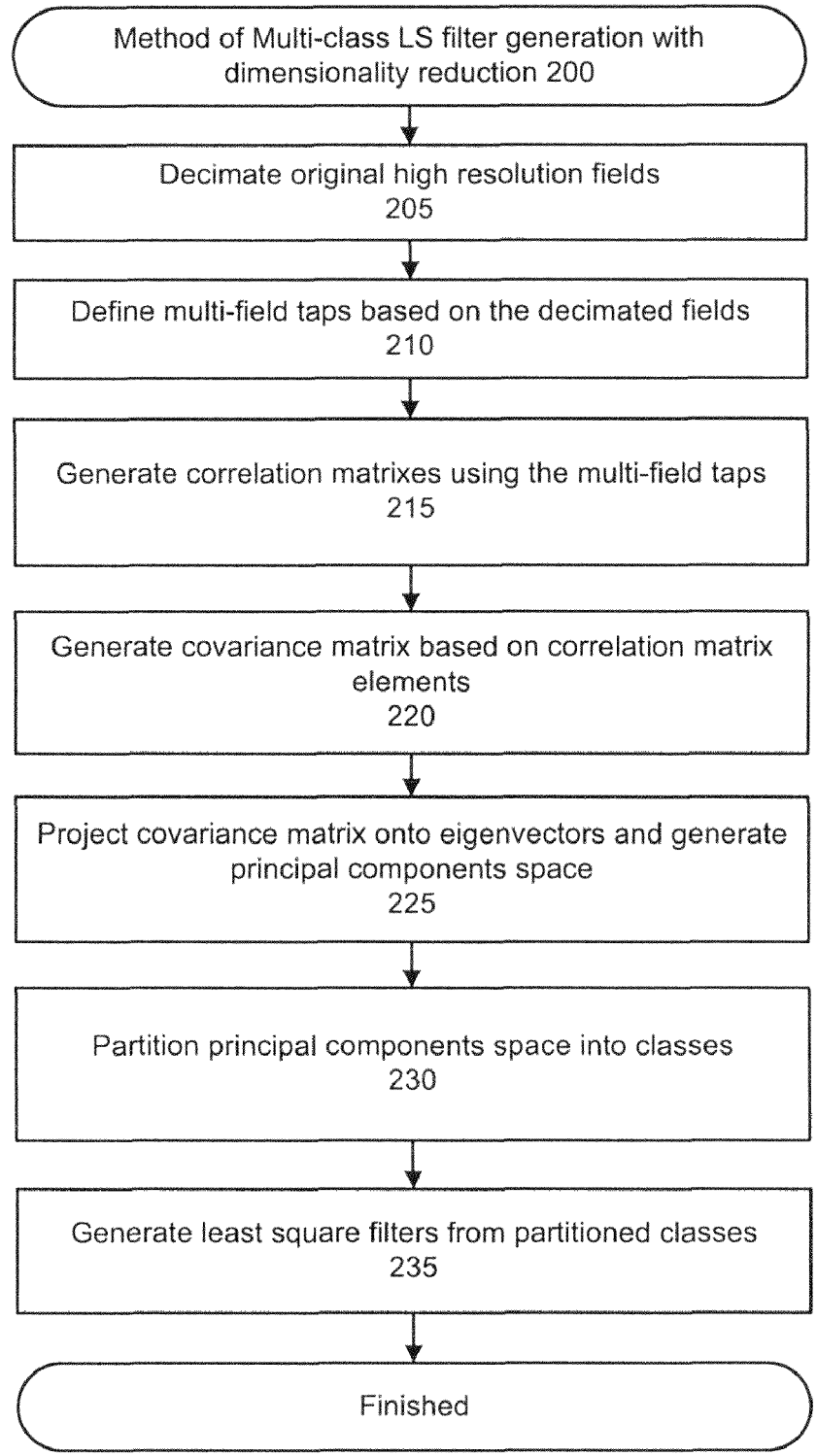
FIG. 2 is a flow diagram illustrating a method of adaptive prediction using principal components analysis according to an embodiment of the invention.

FIG. 2 illustrates a method 200 of PCA according to an embodiment of the invention. At block 205, the method decimates the original high resolution (e.g., high definition) fields. Decimation of fields is described in greater detail below in conjunction with FIGS. 3A-3B.

At block 210, the method defines multi-field taps over the decimated fields. Multi-field filter taps straddle more than one field of data to be used to generate coefficients for the corresponding pixel. Multi-field filter taps are described in greater detail below in conjunction with FIGS. 3B and 4.

At block 215, the method generates correlation matrices that include the cross relationships between the pixels in the multi-field filter taps. Elements of the correlation matrices represent the pixels in the decimated image in a high dimensional space. The method carries the problem over to a lower dimensional space using PCA to classify the pixels more efficiently.

At block 220, the method generates a covariance matrix of the correlation matrix elements as in equation 3. The method places the correlation matrix elements for each decimated pixel into a column format and generates an observation matrix X with m columns after removing the mean vector from each column. Mean vector removal emphasizes the local changes around the pixels. The method applies eigendecomposition to the covariance matrix of X. The decomposition produces n eigenvectors and n eigenvalues where n is the number of elements in the correlation matrices. The covariance matrix has a rank n which is the smaller of m and n, m being the number of pixels. The covariance matrix of X may be defined as:

$$\hat{C}_{xx} = \frac{1}{m-1} XX^T \qquad (3)$$
$$= \frac{1}{m-1} \sum_{i=1}^{m} (\underline{v}_i - \underline{\hat{\mu}})(\underline{v}_i - \underline{\hat{\mu}})^T$$

where $$\underline{\hat{\mu}} = \frac{1}{m} \sum_{i=1}^{m} \underline{v}_i \qquad (4)$$

is the mean vector.

Eigendecomposition operation can be summarized as in equation 5. Q includes the eigenvectors in the columns and Λ is a diagonal matrix with the corresponding eigenvalues.

$$\hat{C}_{xx} = Q \Lambda Q^T = Q \Lambda Q^{-1} \qquad (5)$$

$Q^T$ can be replaced with $Q^{-1}$ because the eigenvectors constitute an orthonormal basis.

At block 225, the method projects the matrix X on to eigenvectors by projecting columns of X on to the columns of Q to obtain the principal components and generate a space with the distribution of principal components as in equation 6. The principal components indicate how similar each column of X is to each eigenvector. The matrix P includes the PCs. Each pixel is represented by a predetermined number of eigenvectors.

$$P = Q^T X \qquad (6)$$

Filter coefficients are functions of the correlation matrices corresponding to the decimated pixels around the center pixel. The filter tap identifies the filter coefficients. The method classifies the decimated image pixels based on the similarities of the corresponding correlation matrices and generates a different set of filter coefficients for each class. The method obtains eigenvectors using correlation information of a filter tap to represent each decimated image pixel and sorts the eigenvectors according to their eigenvalues.

The method 200 may use PCA to transform the classification problem into a space with axes defined by the eigenvectors. The method uses the similarity between columns of X (each column represents a different pixel) and the eigenvectors as the coordinates of the decimated pixels in the reduced dimensional space.

At block 230, the method 200 partitions the PC space into classes. PC space represents the decimated image pixels in the lower dimensional space and regions with similar correlation matrices are grouped together in the PC space. The method initially partitions each of the axes into three regions such that there will be equal number of pixels in each region, which results in a total of twenty-seven regions in three dimensions, with the pixels classified into twenty-seven groups. In other embodiments, the number of classes is not statically defined as 27. Selecting different numbers of classes is described in greater detail below in conjunction with FIG. 14.

At block 235, the method generates a least squares (LS) filter for each class. The LS filter minimizes the sum of the squared difference between the original and predicted images over all pixels in the original (target) frame. The method obtains the filter coefficients by taking the partial derivatives with respect to each filter element and forcing it to be zero for each:

$$e = \sum_{\vec{x}} (I(\vec{x}) - P(\vec{x}))^2 \tag{7}$$

The method 200, as illustrated in FIG. 2, determines the set of coefficients in the filter taps L using the correlations of the pixels determined by the filter taps:

$$L = (A)^{-1} b \tag{8}$$

where $$A_{j,k} = \sum_{\vec{x}} I^D(\vec{y}_j^{\vec{x}}) I^D(\vec{y}_k^{\vec{x}}) \tag{9, 10}$$

$$b_k = \sum_{\vec{x}} I^D(\vec{y}_k^{\vec{x}}) I(\vec{x})$$

where $A_{j,k}$ is the correlation matrix (indices j and k run over two filter taps T) and $b_k$ is the observation vector. $I^D$ represents the decimated image.

The method 200 generates the LS filter using an observation vector and an inverse of the correlation matrices. The method uses different LS filters specific to each region. Assuming that there are m pixels and c classes (regions) in the decimated image, $$m = m_1 + m_2 + \ldots + m_c \tag{11}$$

shows the number of pixels in each class. For a given class u, $$L^u = (A^u)^{-1} b^u \tag{12}$$

where $$A_{j,k}^u = \sum_{\vec{x}|u=S(\vec{x})} I^D(\vec{y}_j^{\vec{x}}) I^D(\vec{y}_k^{\vec{x}}) \tag{13, 14}$$

$$b_k^u = \sum_{\vec{x}|u=S(\vec{x})} I^D(\vec{y}_k^{\vec{x}}) I(\vec{x})$$

where $$u = S(\vec{x}) \tag{15}$$

is the prediction filter classification map for the target pixel x.

Figure 3B:
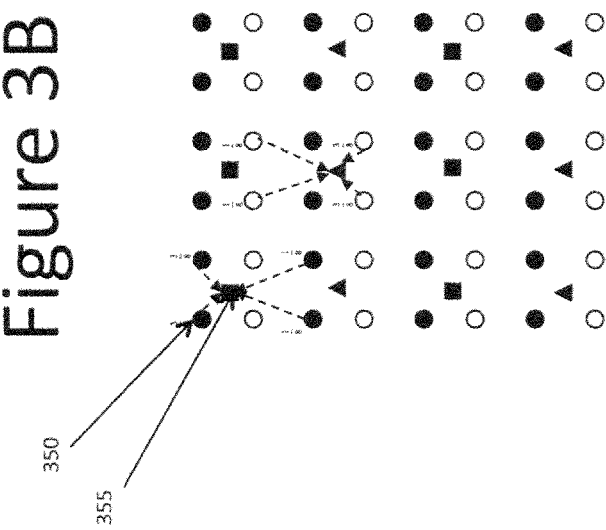
FIGS. 3A and 3B are diagrams illustrating examples of decimation according to an embodiment of the invention.
Figure 3A:
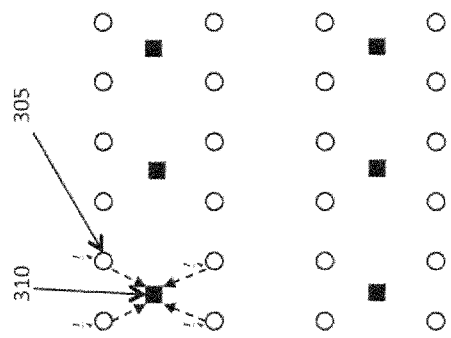

FIG. 3A is a diagram illustrating decimation for spatial algorithms using a single time period. Each source pixel identified by filter tap 305 contributes one-quarter of its value to the value of decimated pixel 310.

FIG. 3B is a diagram illustrating decimation for a spatiotemporal algorithm according to an embodiment of the invention using two time periods. The decimation operation illustrated in FIG. 3B uses two or more time fields as input to a prediction algorithm. A multi-field filter tap 350 determines which pixels are drawn from which time fields. The decimation operation uniformly distributes the decimation with weighted coefficients to generate decimated pixel 355. In other embodiments, more complex and adaptive decimation algorithms are used.

Figure 4:
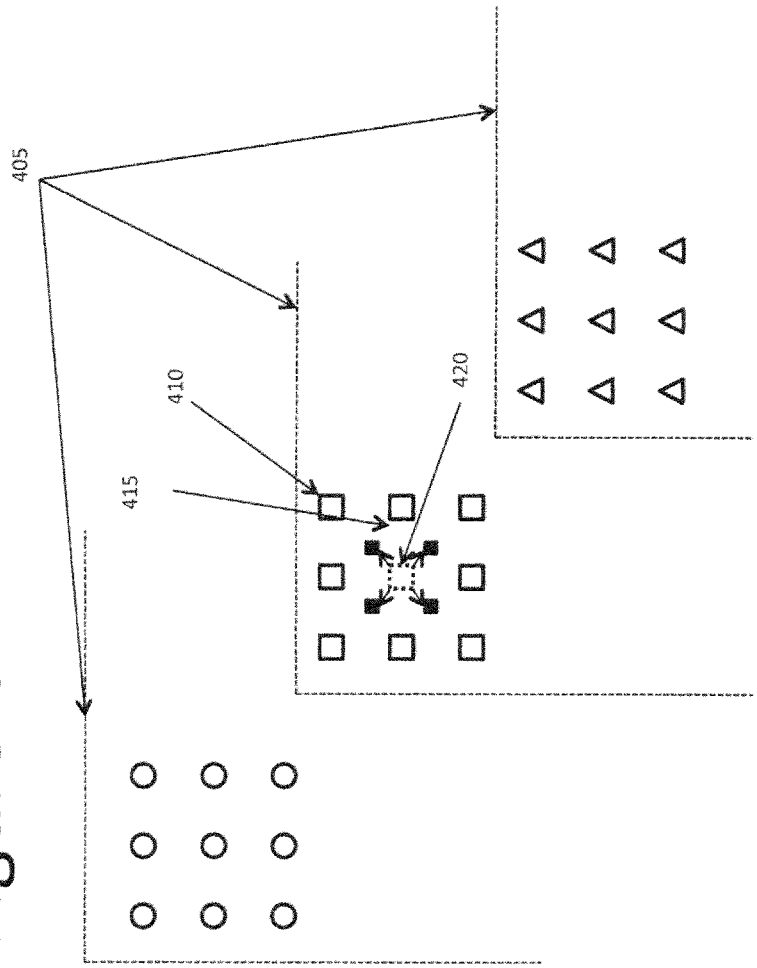
FIG. 4 is a diagram illustrating prediction using fields from multiple times according to an embodiment of the invention.

FIG. 4 is a diagram illustrating a sample spatiotemporal filter tap that uses three fields 405 from three different time fields. The multi-field filter tap uses nine decimated pixels 410 from each field as input to the prediction filter to predict pixels 415 around center pixel 420. The multi-field filter tap moves over the decimated image to predict a higher resolution video field. The method may obtain optimized filter elements through a least squares process.

Figure 5:
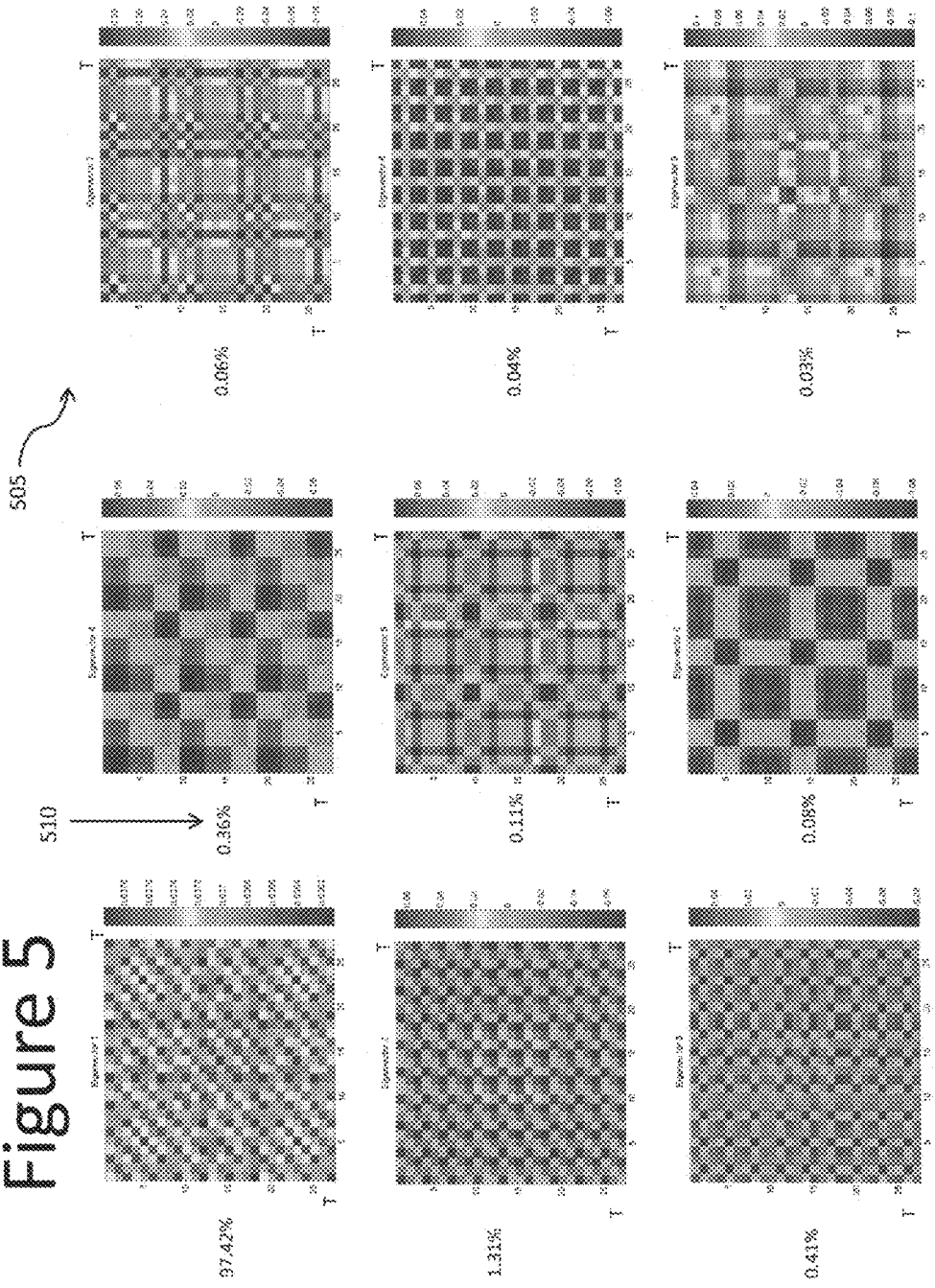
FIG. 5 is a diagram illustrating eigenvector variance coverage according to an embodiment of the invention.

FIG. 5 illustrates the first nine eigenvectors 505 with the decreasing variance after the method places them back into matrix form. The percentages 510 indicate how much of the total variance of the original field each eigenvectors carries.

Figure 6:
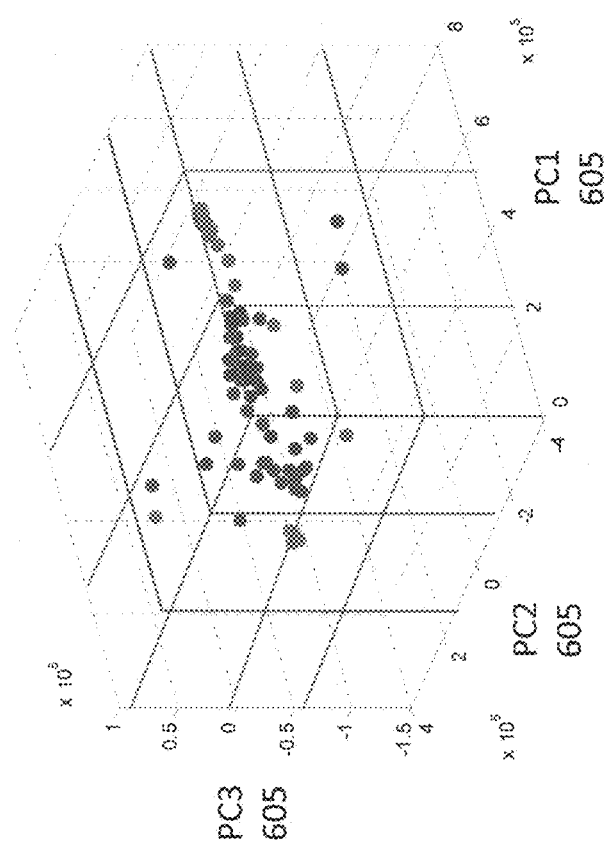
FIG. 6 is a diagram illustrating a principal component space according to an embodiment of the invention.

In one embodiment, the method obtains improved results using the first three eigenvectors in a three-dimensional space, representing each of the decimated pixels with three coordinates. FIG. 6 illustrates the distribution of a subset of these pixels based on a partition operation. The axes PC1 605, PC2 605, and PC3 605 correspond to the first three eigenvectors and coordinates of each pixel are the corresponding principal components.

In another embodiment, at block 230 the method 200 uses clustering to classify pixels into finer groups in the reduced dimensional space using a dynamic validity index. The dynamic validity index is a cost function that measures the compactness of a pixel class and the distance between the classes themselves. The goal of clustering is to minimize the distance between pixels in the same class, which increases the compactness of the class, and maximizing the distance between classes. Empirical data suggests that iterative clustering classifies the pixels efficiently and provides an SNR improvement.

Figure 14:
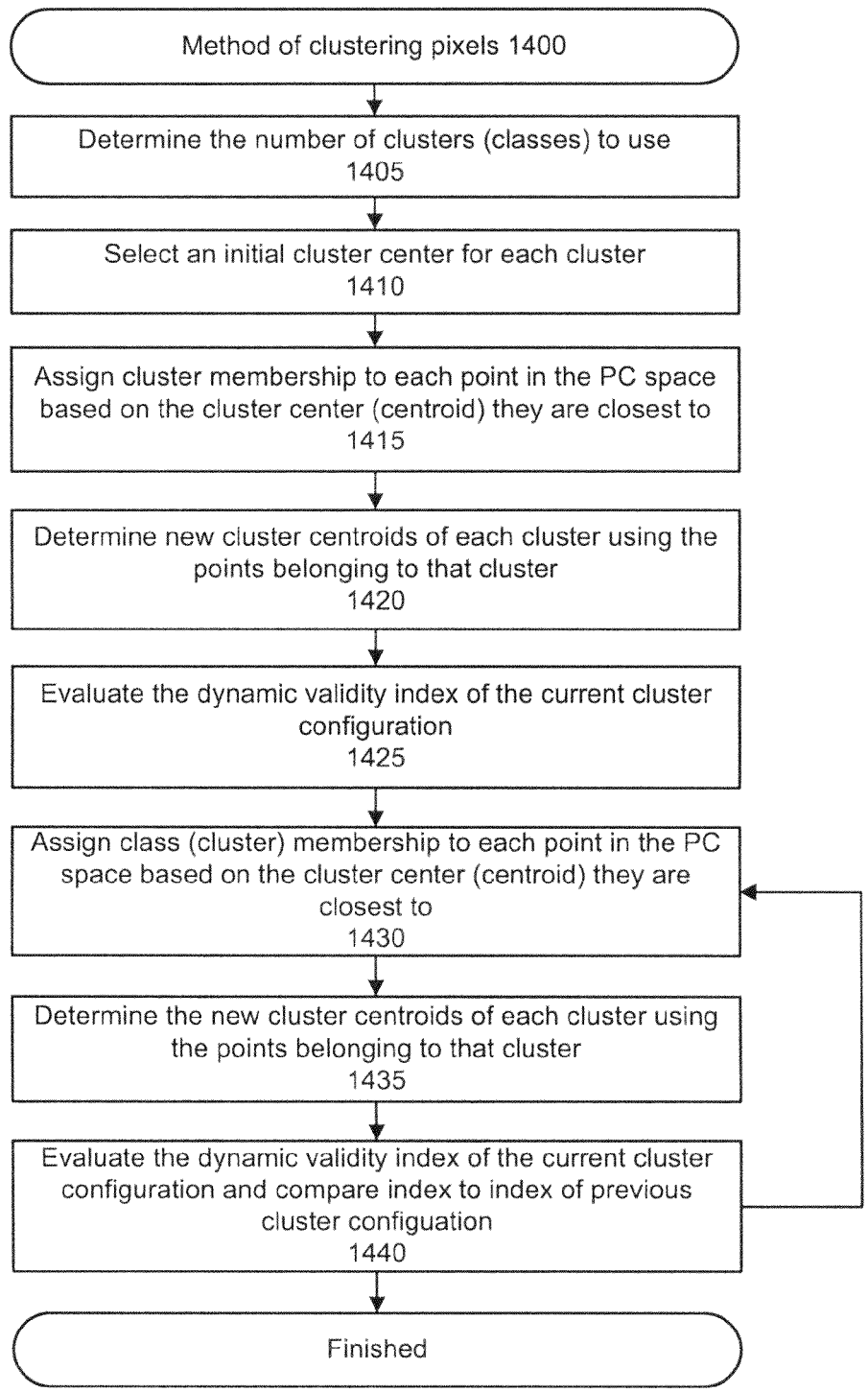
FIG. 14 is a flow diagram illustrating a method of clustering pixels according to an embodiment of the invention.

FIG. 14 illustrates a method 1400 of clustering pixel classes according to an embodiment of the invention. The number of clusters, c, is treated as known regardless of the distribution of the pixels in the PC space. At block 1405, the method determines a number of classes to use.

At block 1410, the method labels each pixel with a number and selects a uniform distribution of c numbers in this range. The method uses this uniform selection as initial values for the centroids (weighted centers) of the c classes to be clustered.

At block 1415, the method assigns each pixel to the closet centroids (and cluster) based on the distance of the pixel to each of the centroids.

At block 1420, the method determines new cluster centroids for each cluster using the pixel assignments.

At block 1425, the method evaluates the dynamic validity index of the current clustering configuration. In other embodiments, other cost functions may be used. The dynamic validity index may be defined as:

$$\text{Dynamic Validity Index} = \frac{\text{Intra}}{\text{Inter}} = \frac{\frac{1}{N} \sum_{i=1}^{k} \sum_{x \in C_i} \|x - z_i\|^2}{\min_{i,j} (\|z_i - z_j\|)^2} \tag{16}$$

where N is the number of points (data objects), k is the number of clusters, x is the location of a data point, $z_i$ is the cluster center location (centroid) of the $i^{th}$ cluster and $C_i$ is the set of points in the $i^{th}$ cluster. The dynamic validity index includes an intra-cluster term (numerator) and an inter-cluster term (denominator). The intra-cluster term is the average distance of each point to their corresponding centroid and measures the average level of compactness of all clusters. The inter-cluster term is the distance between the pair of clusters that are closest to each other among all pairs of clusters.

At block 1430, the method assigns new class membership to each point (pixel) in the PC space based on the closest cluster centroid.

At block 1435, the method determines new cluster centroids of each cluster based on the new class assignments.

At block 1440, the method evaluates the validity index of the new configuration, and compares this validity index with the validity index generated at block 1425. If the difference between the indexes exceeds a threshold, the method returns to block 1430 and goes through an additional iteration of clustering. Otherwise, the method uses the current clustering scheme. During the first iteration, the method compares the index evaluated at block 1440 with the index evaluated at block 1425. During subsequent iterations, the method compares the index evaluated at block 1440

The method evaluates the dynamic validity index at each iteration and continues until the change between iterations drops below a threshold. When this occurs, no further assignments are made and the method 1400 uses the current clustering scheme to partition the PC space. Empirical data suggests that between twenty and thirty iterations are required before the results saturate and drop below the threshold.

The method 1400 uses the dynamic validity index to provide a point of comparison for clustering configurations. The method recursively adjusts the class assignments based on the current set of centroids and adjusts the centroids based on the current class assignments. In this way, the method iteratively improves the clustering until the improvement saturates.

After the method 1400 completes the clustering operation at block 230 of FIG. 2, the method 200 uses each member of each cluster to generate the LS filter coefficients, which produces a dynamically clustered LS filter.

Figure 8:
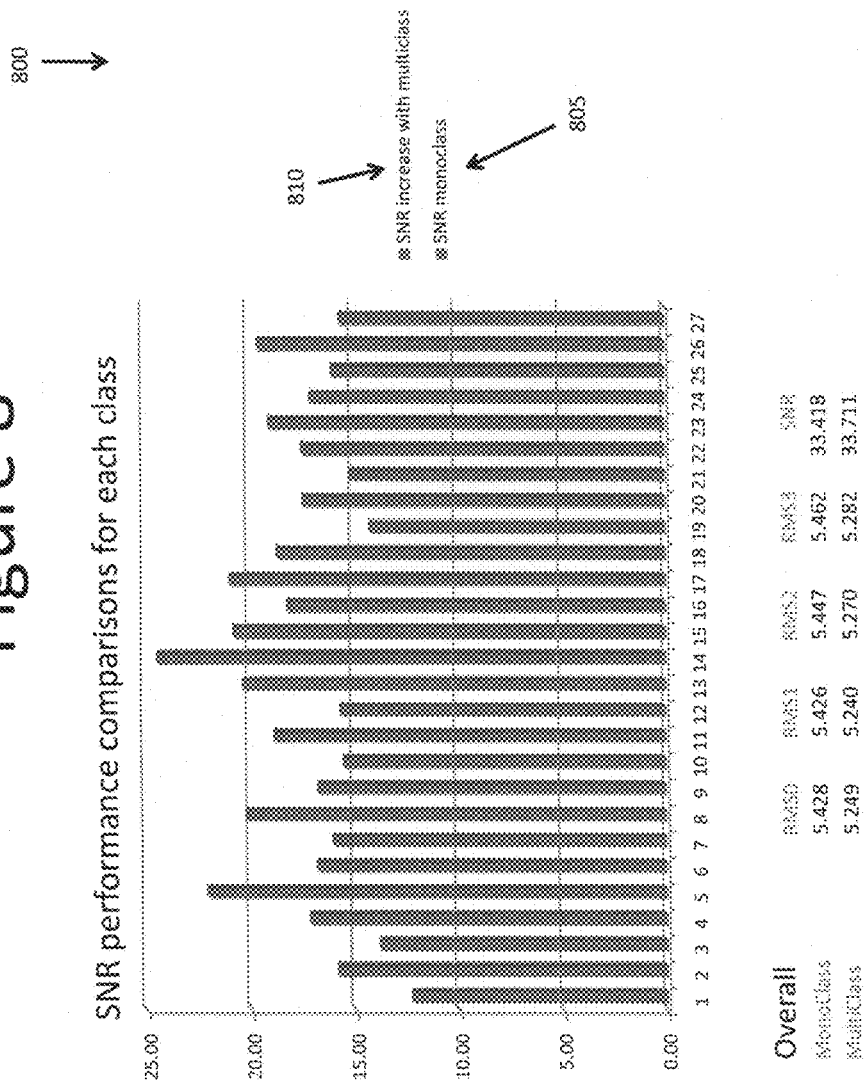
FIG. 8 is a diagram illustrating classification performance according to an embodiment of the invention.

FIG. 8 illustrates a comparison 800 of the signal-to-noise ratio (SNR) performance of static clustering 805 and dynamic clustering 810. Red portions of the performance indicate the gain resulting from use of class specific LS filters derived with a dynamic clustering method such as method 1400.

Figure 9:
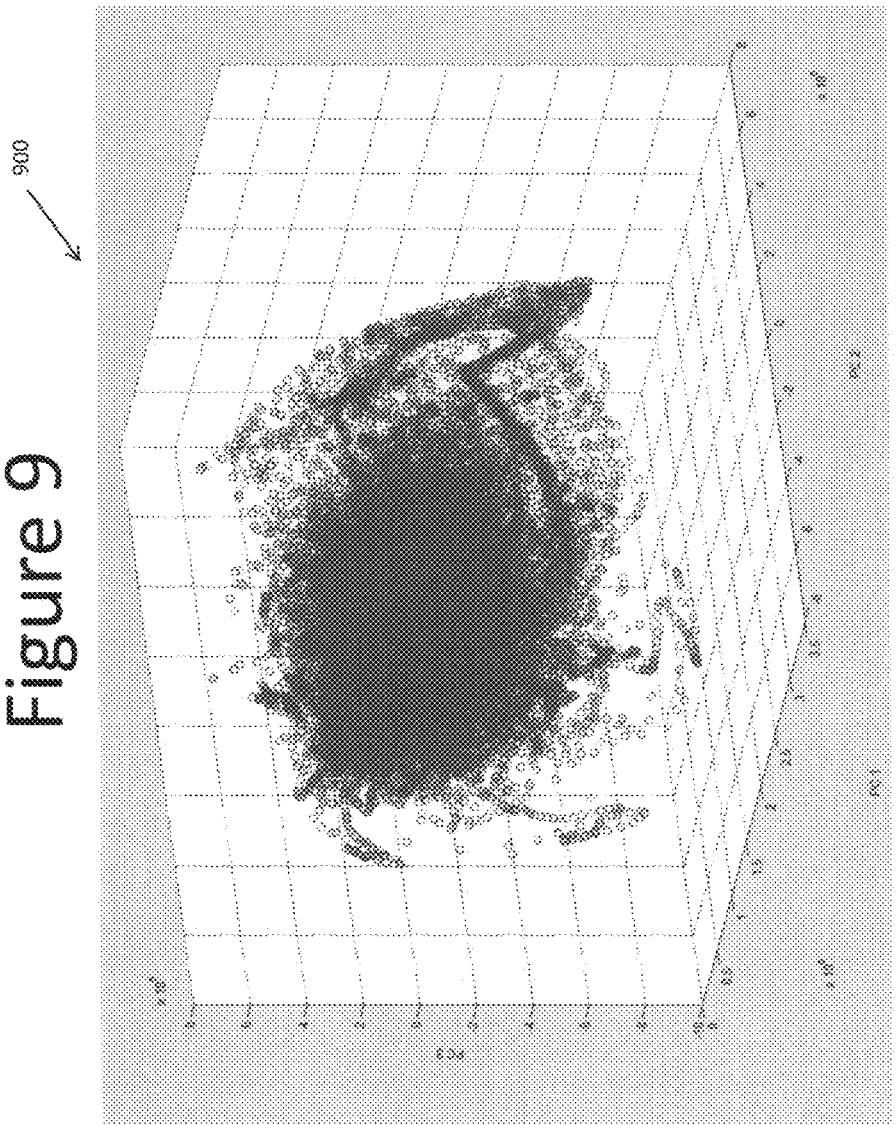
FIG. 9 is a diagram illustrating point distribution according to an embodiment of the invention.
Figure 10:
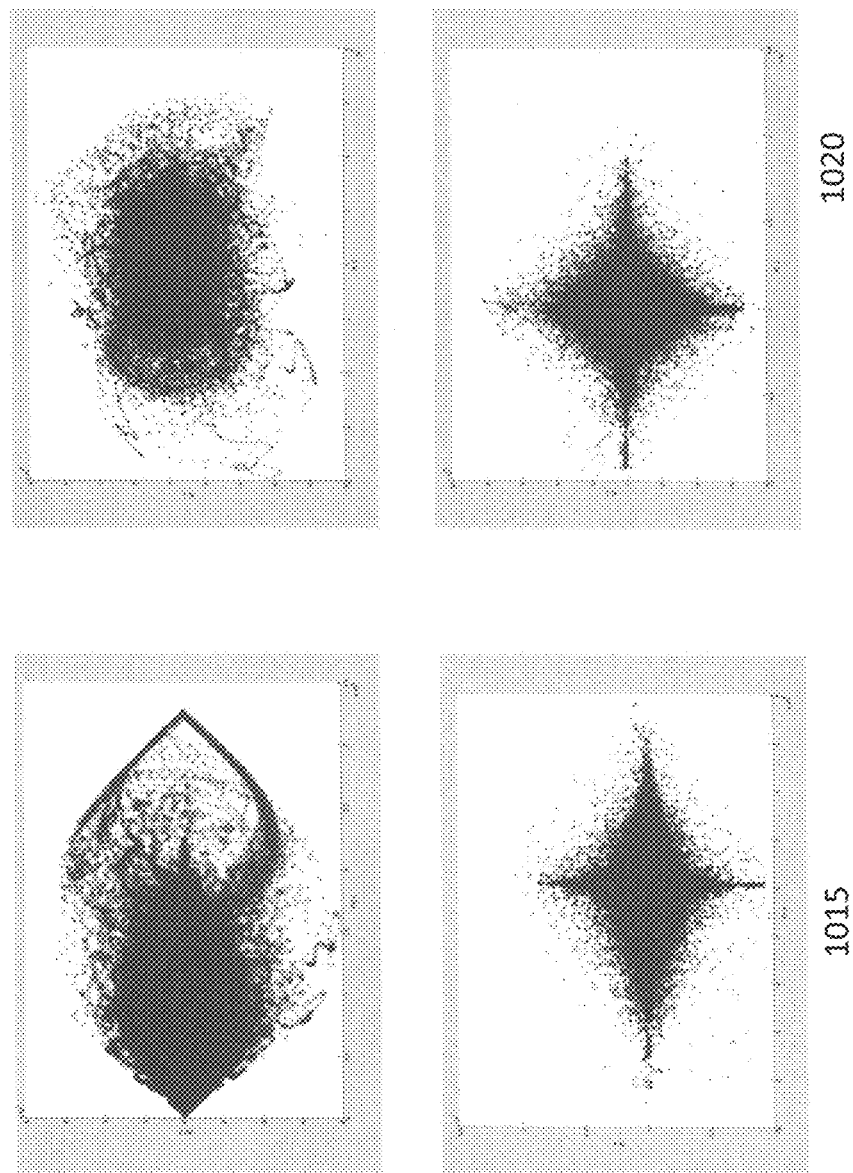
FIGS. 10A-10D illustrate another point distribution according to an embodiment of the invention.

Iterative clustering classifies pixels in the decimated images and generates a different set of LS coefficients for each class. FIG. 9 illustrates a sample distribution 900 of pixels of a decimated image in three-dimensional space. Each pixel is represented with principal components one, two, and three.

FIGS. 10A-10D represent a pair-wise distribution of PC1-2 1005, PC2-3 1010, PC3-4 1015, and PC4-5 1020. These pairs represent projections of a five dimensional distribution on to various two dimensional planes.

Figure 11:
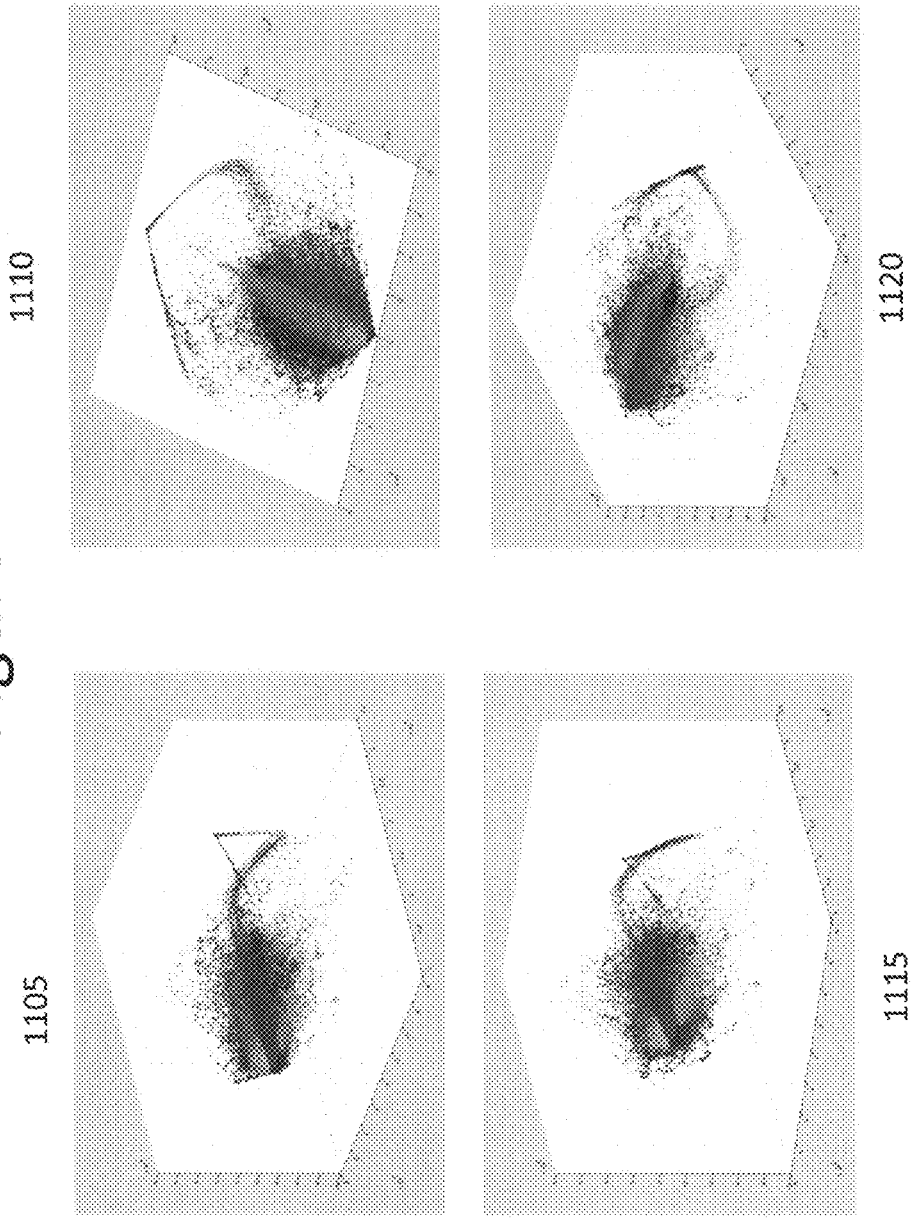
FIG. 11 illustrates yet another point distribution from various perspectives according to an embodiment of the invention.

FIG. 11 illustrates various perspectives 1105-1120 of a distribution divided into thirty-two clusters. Each cluster is represented by a different tone of gray.

Figure 12:
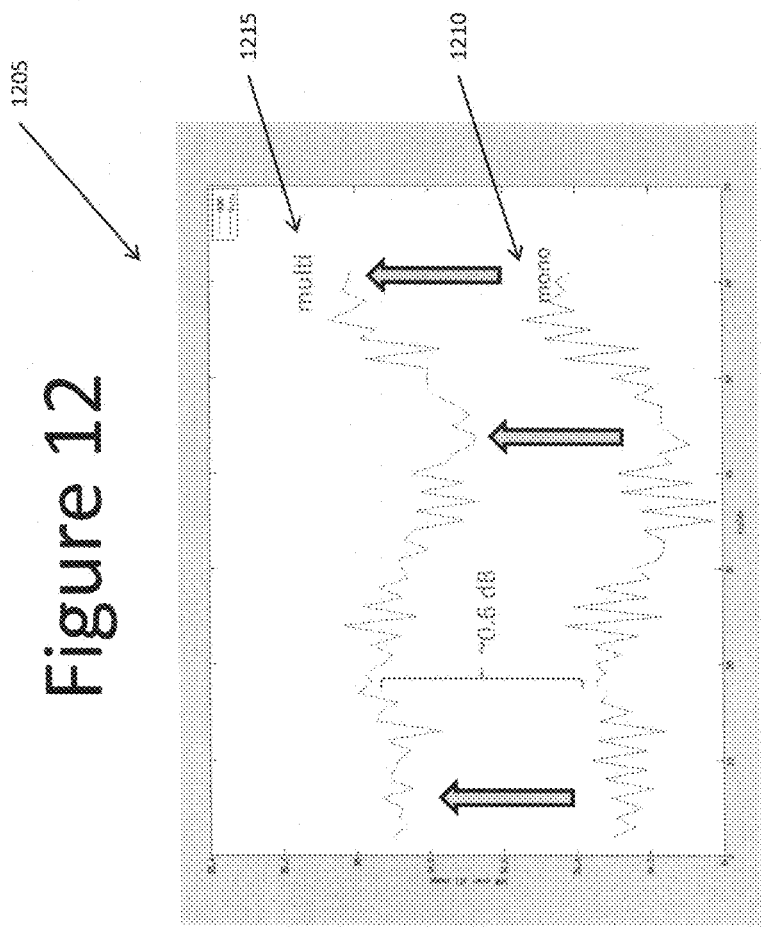
FIG. 12 is a diagram illustrating another classification performance according to an embodiment of the invention.

FIG. 12 illustrates the SNR results 1205 obtained using an embodiment of the invention. Analyses were repeated for every field (sixty times during the video scene) with five dimensional spaces using the first five eigenvectors. SNR performance 1215 of the dynamic clustering LS filter is compared with the SNR performance 1210 of static clustering LS filters. Approximately 0.6 dB NSR performance increase was obtained over all scenes.

FIG. 13 illustrates the results of similar analyses varying parameters of the clustering method. SNR improvements 1305 are obtained as more PCs 1315 are used up until seven PCs. Ninety-nine percent of variance is demonstrably incorporated into the first seven PCs. Performance continued to increase when increasing the number of classes 1310, as would be expected.

The particular methods of the invention are described in terms of computer software with reference to a series of flow diagrams illustrated in FIGS. 2 and 14. The methods constitute computer programs made up of machine-executable instructions illustrated as blocks. Describing the methods by reference to a flow diagram enables one skilled in the art to develop such programs including such instructions to carry out the methods on suitably configured machines (the processor of the machine executing the instructions from machine-readable media, including memory.) The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or produce a result. It will be appreciated that more or fewer processes may be incorporated into the methods illustrated in FIGS. 2 and 14 without departing from the scope of the invention and that no particular order is implied by the arrangement of blocks shown and described herein.

Figure 7A:
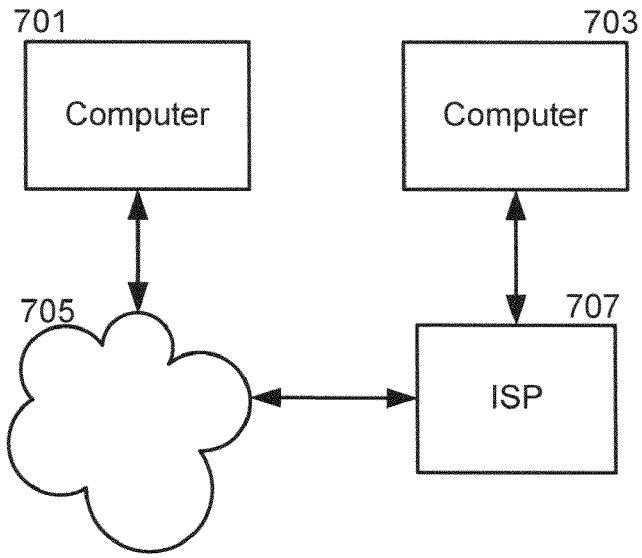
FIGS. 7A and 7B are diagrams of a computer environment suitable for practicing the invention.

In one embodiment, as shown in FIG. 7A, a server computer 701 is coupled to, and provides data through, the Internet 705. A client computer 703 is coupled to the Internet 705 through an ISP (Internet Service Provider) 707 and executes a conventional Internet browsing application to exchange data with the server 701. A server computer 701 may executed the methods illustrated in FIGS. 2 and 14. Optionally, the server 701 can be part of an ISP which provides access to the Internet for client systems. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet allows users of client computer systems to exchange information, receive and send e-mails, view documents, such as documents which have been prepared in the HTML format, and receive content. It is readily apparent that the present invention is not limited to Internet access and Internet web-based sites; directly coupled and private networks are also contemplated.

Figure 7B:
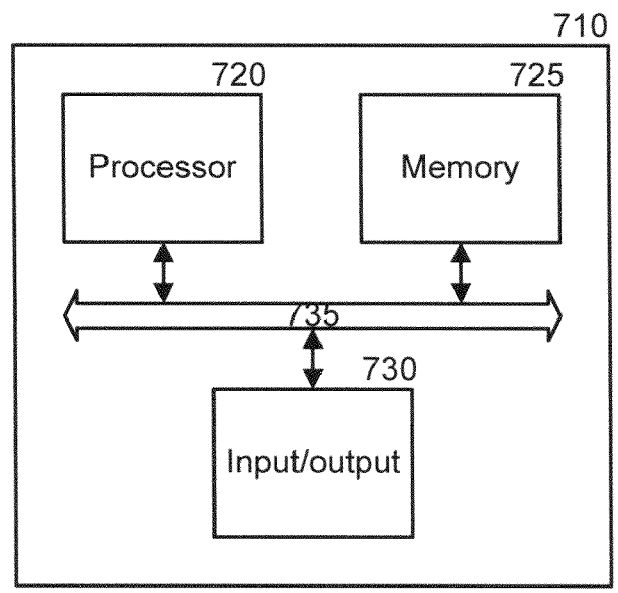

One embodiment of a computer system suitable for use as server 701 is illustrated in FIG. 7B. The computer system 710, includes a processor 720, memory 725 and input/output capability 730 coupled to a system bus 735. The memory 725 is configured to store instructions which, when executed by the processor 720, perform the methods described herein. The memory 725 may also store data for/of adaptive prediction using dimensionality reduction. Input/output 730 provides for the delivery and display of the data for/of adaptive prediction using dimensionality reduction or portions or representations thereof, and also the input of data of various types for storage, processing or display. Input/output 730 also encompasses various types of machine-readable media, including any type of storage device that is accessible by the processor 720. One of skill in the art will immediately recognize that the server 701 is controlled by operating system software executing in memory 725. Input/output 730 and related media store the machine-executable instructions for the operating system and methods of the present invention as well as the data for/of adaptive prediction using dimensionality reduction.

The description of FIGS. 7A-B is intended to provide an overview of computer hardware and other operating components suitable for implementing the invention, but is not intended to limit the applicable environments. It will be appreciated that the computer system 740 is one example of many possible computer systems which have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Adaptive prediction using dimensionality reduction has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to adaptive prediction using dimensionality reduction is meant to include all of these environments. Therefore, it is manifestly intended that this invention be limited only by the following claims and equivalents thereof.

What is claimed is:

1. A computerized method comprising:
assigning, by a processor, an initial value to a center point for each cluster in a plurality of clusters;
assigning each point in a point space to a closest cluster in the plurality of clusters based on the distance between each point and the center point of the closest cluster;
determining a first-assignment value for the center point for each cluster in the plurality of clusters using the assigning;
evaluating a first-assignment dynamic validity index of a current cluster configuration using the first-assignment values;
reassigning each point in the point space to the closest cluster based on the first-assignment value of each center;
determining a second-assignment value for the center for each cluster using the reassigning;
evaluating a second-assignment dynamic validity index of the current cluster configuration using the second-assignment values;
selecting the current cluster configuration if a difference between the first-assignment dynamic validity index and the second-assignment dynamic validity index is less than a threshold, wherein the current cluster configuration defines clusters of pixel classes.

2. The computerized method of claim 1, wherein each dynamic validity index is calculated from an intra-cluster term and an inter-cluster term, the intra-cluster term being an average distance of each point to its corresponding center point and the inter-cluster term being a distance between a pair of clusters that are closest to each other among all pairs of clusters.

3. The computerized method of claim 2, wherein the intra-cluster term is calculated as $$\frac{1}{N} \sum_{i=1}^{k} \sum_{x=C_i} \|x - z_i\|^2$$

and the inter-cluster term is calculated as $$\min_{i,j} (\| z_i \ z_j \|)^2,$$

and wherein N is the number of points, k is the number of clusters, x is the location of a data point, $z_i$ is the center point of the $i^{th}$ cluster, and $C_i$ are the points in the $i^{th}$ cluster.

4. A non-transitory computer-readable storage medium storing instructions which when executed by a data processing system cause the data processing system to perform operations that process data, the operations comprising:
assigning an initial value to a center point for each cluster in a plurality of clusters;
assigning each point in a point space to a closest cluster in the plurality of clusters based on the distance between each point and the center point of the closest cluster;
determining a first-assignment value for the center point for each cluster in the plurality of clusters using the assigning;
evaluating a first-assignment dynamic validity index of a current cluster configuration using the first-assignment values;
reassigning each point in the point space to the closest cluster based on the first-assignment value of each center;
determining a second-assignment value for the center for each cluster using the reassigning;
evaluating a second-assignment dynamic validity index of the current cluster configuration using the second-assignment values;
selecting the current cluster configuration if a difference between the first-assignment dynamic validity index and the second-assignment dynamic validity index is less than a threshold, wherein the current cluster configuration defines clusters of pixel classes.

5. The non-transitory computer-readable storage medium of claim 4, wherein each dynamic validity index is calculated from an intra-cluster term and an inter-cluster term, the intra-cluster term being an average distance of each point to its corresponding center point and the inter-cluster term being a distance between a pair of clusters that are closest to each other among all pairs of clusters.

6. The non-transitory computer-readable storage medium of claim 5, wherein the intra-cluster term is calculated as $$\frac{1}{N} \sum_{i=1}^{k} \sum_{x=C_i} \|x - z_i\|^2$$

and the inter-cluster term is calculated as $$\min_{i,j} (\| z_i \ z_j \|)^2,$$

and, wherein iv is the number of points, k is the number of clusters, x is the location of a data point, $z_i$ is the center point of the $i^{th}$ cluster, and $C_i$ are the points in the $i^{th}$ cluster.

7. A system comprising:

a processor coupled to a bus;

a memory coupled to the processor through the bus; and instructions executed by the processor from the memory to cause the processor to assigning an initial value to a center point for each cluster in a plurality of clusters;

assign each point in a point space to a closest cluster in the plurality of clusters based on the distance between each point and the center point of the closest cluster;

determine a first-assignment value for the center point for each cluster in the plurality of clusters using the assigning;

evaluate a first-assignment dynamic validity index of a current cluster configuration using the first-assignment values;

reassign each point in the point space to the closest cluster based on the first-assignment value of each center;

determine a second-assignment value for the center for each cluster using the reassigning;

evaluate a second-assignment dynamic validity index of the current cluster configuration using the second-assignment values;

select the current cluster configuration if a difference between the first-assignment dynamic validity index and the second-assignment dynamic validity index is less than a threshold, wherein the current cluster configuration defines clusters of pixel classes.

8. The system of claim 7, wherein each dynamic validity index is calculated from an intra-cluster term and an inter-cluster term, the intra-cluster term being an average distance of each point to its corresponding center point and the inter-cluster term being a distance between a pair of clusters that are closest to each other among all pairs of clusters.

9. The system of claim 8, wherein the intra-cluster term is calculated as $$\frac{1}{N} \sum_{i=1}^{k} \sum_{x=C_i} \|x - z_i\|^2$$

and the inter-cluster term is calculated as $$\min_{i,j} (\| z_i - z_j \|)^2,$$

and wherein N is the number of points, k is the number of clusters, x is the location of a data point, $z_i$ is the center point of the $i^{th}$ cluster, and $C_i$ are the points in the $i^{th}$ cluster.

10. A data processing system comprising:

means for assigning an initial value to a center point for each cluster in a plurality of clusters;

means for assigning each point in a point space to a closest cluster in the plurality of clusters based on the distance between each point and the center point of the closest cluster;

means for determining a first-assignment value for the center point for each cluster in the plurality of clusters using the assigning;

means for evaluating a first-assignment dynamic validity index of a current cluster configuration using the first-assignment values;

means for reassigning each point in the point space to the closest cluster based on the first-assignment value of each center;

means for determining a second-assignment value for the center for each cluster using the reassigning;

means for evaluating a second-assignment dynamic validity index of the current cluster configuration using the second-assignment values;

means for selecting the current cluster configuration if a difference between the first-assignment dynamic validity index and the second-assignment dynamic validity index is less than a threshold, wherein the current cluster configuration defines clusters of pixel classes.

* * * * *